US010750342B2

(12) United States Patent
Sekiya et al.

(10) Patent No.: US 10,750,342 B2
(45) Date of Patent: Aug. 18, 2020

(54) WIRELESS COMMUNICATION SYSTEM AND WIRELESS COMMUNICATION DEVICE

(71) Applicant: FELICA NETWORKS, INC., Tokyo (JP)

(72) Inventors: Shuichi Sekiya, Saitama (JP); Minako Takahashi, Tokyo (JP); Shintaro Inoue, Kanagawa (JP)

(73) Assignee: FELICA NETWORKS, INC., Tokyo (JP)

(*) Notice: Subject to any disclaimer, the term of this patent is extended or adjusted under 35 U.S.C. 154(b) by 0 days.

(21) Appl. No.: 16/321,872

(22) PCT Filed: Jul. 14, 2017

(86) PCT No.: PCT/JP2017/025791
§ 371 (c)(1),
(2) Date: Jan. 30, 2019

(87) PCT Pub. No.: WO2018/037764
PCT Pub. Date: Mar. 1, 2018

(65) Prior Publication Data
US 2019/0191288 A1  Jun. 20, 2019

(30) Foreign Application Priority Data
Aug. 22, 2016 (JP) .................................. 2016-161899

(51) Int. Cl.
*H04W 4/80* (2018.01)
*H04M 11/00* (2006.01)
(Continued)

(52) U.S. Cl.
CPC .......... *H04W 4/80* (2018.02); *G06Q 20/3278* (2013.01); *G06Q 50/12* (2013.01); *H04M 11/00* (2013.01); *H04M 11/062* (2013.01)

(58) Field of Classification Search
CPC ...................................................... H04W 4/80
See application file for complete search history.

(56) References Cited

U.S. PATENT DOCUMENTS

| 2006/0218040 A1* | 9/2006 | Sabapathypillai | ..... G06Q 30/06 705/15 |
| 2014/0324607 A1* | 10/2014 | Frehn | .................... G06Q 50/12 705/15 |

FOREIGN PATENT DOCUMENTS

| JP | 2001-306666 A | 11/2001 |
| JP | 2016-066158 A | 4/2016 |

OTHER PUBLICATIONS

International Search Report and Written Opinion of PCT Application No. PCT/JP2017/025791, dated Aug. 29, 2017, 07 pages of ISRWO.

* cited by examiner

*Primary Examiner* — Hsinchun Liao
(74) *Attorney, Agent, or Firm* — Chip Law Group

(57) ABSTRACT

There is provided a wireless communication system including a plurality of wireless communication devices that transmits a signal relating to provision of service. The service includes a plurality of stages relating to provision. A plurality of the wireless communication devices correspond to a plurality of the respective stages and transmit the signal corresponding to the stage with radio field intensity corresponding to the stage. In addition, there is provided a wireless communication device including a transmitter that transmits a signal relating to a request of service and a receiver that receives a signal relating to provision of the service from a connection device connected on the basis of a signal relating to the request. The service includes a plurality of stages relating to provision. The transmitter transmits the signal relating to the request corresponding to (Continued)

the stage with radio field intensity corresponding to the stage.

18 Claims, 16 Drawing Sheets

(51) Int. Cl.
*G06Q 50/12* (2012.01)
*G06Q 20/32* (2012.01)
*H04M 11/06* (2006.01)

WIRELESS COMMUNICATION SYSTEM AND WIRELESS COMMUNICATION DEVICE

CROSS REFERENCE TO RELATED APPLICATIONS

This application is a U.S. National Phase of International Patent Application No. PCT/JP2017/025791 filed on Jul. 14, 2017, which claims priority benefit of Japanese Patent Application No. JP 2016-161899 filed in the Japan Patent Office on Aug. 22, 2016. Each of the above-referenced applications is hereby incorporated herein by reference in its entirety.

TECHNICAL FIELD

The present disclosure relates to a wireless communication system and a wireless communication device.

BACKGROUND ART

With recent development of information communication technology, many technologies related to electronic payment are developed. Specifically, there are payment service technologies using wireless communication, such as near-field communication (NFC) or Bluetooth (registered trademark).

In one example, Patent Literature 1 discloses a technique allowing a portable device to transmit and receive a token relating to a transaction, such as payment, by wireless communication.

Further, in one example, Patent Literature 2 discloses a method of processing financial operations allowing for access to a core banking system of a financial institution on the basis of information read from an integrated circuit (IC) card provided in a portable device.

CITATION LIST

Patent Literature

Patent Literature 1: JP 2016-510468T
Patent Literature 2: JP 2003-067570A

DISCLOSURE OF INVENTION

Technical Problem

The techniques disclosed in Patent Literatures 1 and 2 however do not consider a case where the position of the portable device varies with transition of transactions. For this reason, in some cases, the techniques disclosed in Patent Literatures 1 and 2 fail to be applicable to service whose location of provision can vary with transition of transactions.

In view of this, the present disclosure provides a novel and improved wireless communication system and wireless communication device, capable of implementing more efficient and high convenient processing depending on the stage of service.

Solution to Problem

According to the present disclosure, there is provided a wireless communication system including: a plurality of wireless communication devices configured to transmit a signal relating to provision of service. The service includes a plurality of stages relating to provision. A plurality of the wireless communication devices correspond to a plurality of the respective stages and transmit the signal corresponding to the stage with radio field intensity corresponding to the stage.

In addition, according to the present disclosure, there is provided a wireless communication device including: a transmitter configured to transmit a signal relating to a request of service; and a receiver configured to receive a signal relating to provision of the service from a connection device connected on the basis of a signal relating to the request. The service includes a plurality of stages relating to provision. The transmitter transmits the signal relating to the request corresponding to the stage with radio field intensity corresponding to the stage.

Advantageous Effects of Invention

As described above, according to the present disclosure, it is possible to implement more efficient and high convenient processing depending on the stage of service.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
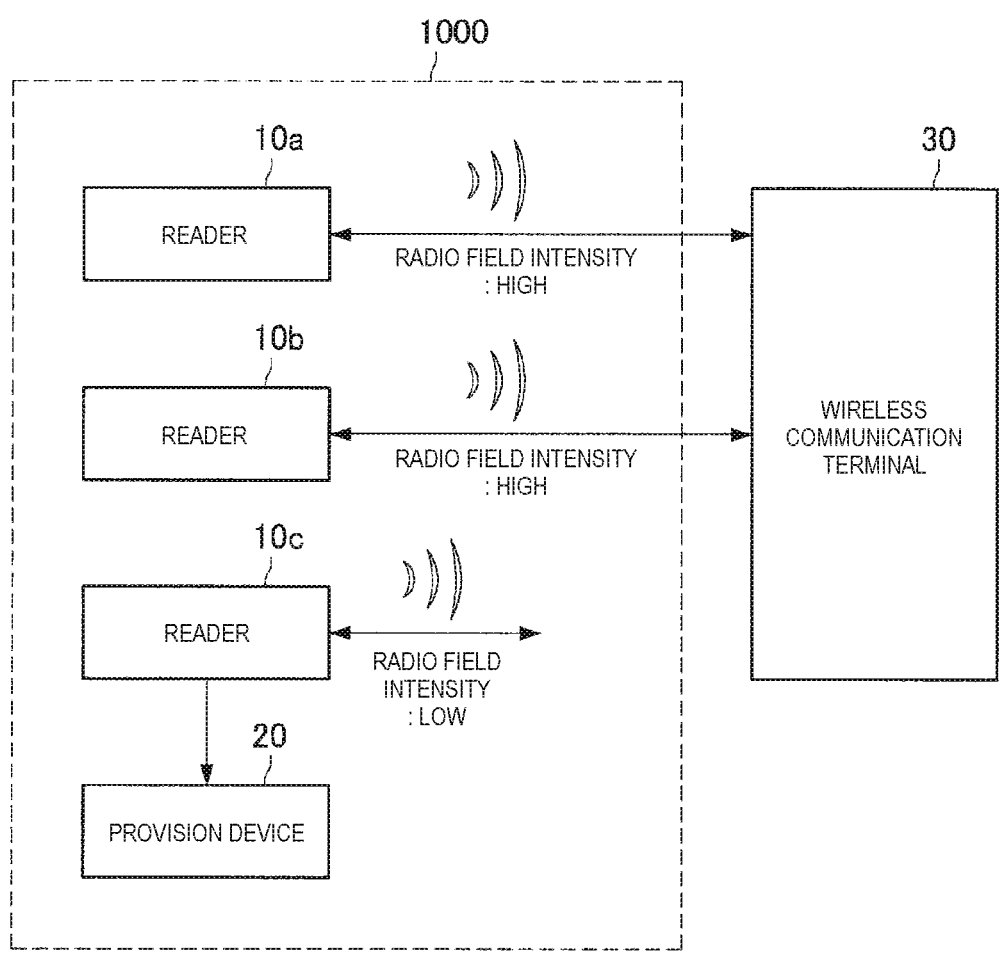
FIG. 1 is a diagram illustrating a configuration example of a wireless communication device according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the order below.
0. Introduction
0.1. Overview of present disclosure
1. First Embodiment
1.1. Configuration example of wireless communication system
1.2. Functional configuration example of reader 10
1.3. Functional configuration example of wireless communication terminal 30
1.4. Operation of wireless communication system 1000
1.5. Modification
2. Second Embodiment
2.1. Configuration example of wireless communication system 1000
2.2. Operation of wireless communication system 1000
3. Hardware configuration example
4. Concluding remarks

0. INTRODUCTION

<<0.1. Overview of Present Disclosure>>

A means of payment using an IC card or a mobile terminal equipped with IC card functions is widespread nowadays. In one example, a consumer is capable of selecting the means of payment mentioned above as a means of making payment, instead of hard cash, in purchasing goods at the checkout counter. Specifically, the payment processing is performed by allowing a point of sale (POS) terminal or the like to read the information about electronic money held in the IC card through wireless communication such as NFC. The means of payment as mentioned above makes it possible to eliminate the complication concerning the delivery of hard cash, thereby enhancing convenience for both consumers and retailers.

On the other hand, in one example, in purchasing goods at a coffee shop, a food court, or the like, there are a plurality of stages until receiving the provision of goods. Such stages include, in one example, a stage of ordering goods while looking at a menu, a step of making payment for the ordered goods, a stage of receiving a notification pertaining to completion of the goods, a stage of receiving the goods, or the like.

However, in many cases, the plurality of stages mentioned above are implemented through many human interventions at present. The automation of the plurality of stages mentioned above is costly due to deployment of dedicated equipment or the like, and so in many cases, only the stage of making payment of goods is systemized practically. In addition, even in a case where the plurality of stages mentioned above is systemized, it is necessary to accommodate a space for an order taking window or a goods delivery window or a space for a queue. For this reason, it is desirable to develop an approach to improve the efficiency of a series of processing relating to provision of goods at low cost in a store such as a coffee shop or food court.

The technical idea according to the present disclosure is conceived focusing on the points mentioned above, and it allows for improving the efficiency of the series of flows from an order to provision of goods at low cost. Thus, the wireless communication system according to the present disclosure includes a plurality of wireless communication devices corresponding to the stages of service, and has one feature that allows for setting an advertisement and radio field intensity depending on the stages to the plurality of wireless communication devices.

The following description of the embodiments is specifically given of the structural features of the wireless communication system and the wireless communication device according to the present disclosure and effects achieved by the features. In addition, the following description of the embodiments is given of a case where the wireless communication system and the wireless communication device according to the present disclosure are applied to provision of service in a coffee shop, a food court, or the like as an example. However, the application of the wireless communication system and the wireless communication device according to the present disclosure is not limited to this example. The wireless communication system and the wireless communication device according to the present disclosure are also applicable to service in a parking lot, a locker, or the like. The wireless communication system and the wireless communication device according to the present disclosure are widely applicable to service including a plurality of stages.

1. FIRST EMBODIMENT

<<1.1. Configuration Example of Wireless Communication System>>

A first embodiment of the present disclosure is first described. FIG. 1 is a diagram illustrating a configuration example of a wireless communication system 1000 according to the present embodiment. Referring to FIG. 1, the wireless communication system 1000 according to the present embodiment includes a plurality of readers 10a to 10c and a provision device 20. In addition, the plurality of readers 10a to 10c according to the present embodiment each performs wireless communication with the wireless communication terminal 30.

(Reader 10)

The reader 10 according to the present embodiment can be a wireless communication device arranged in a coffee shop, a food court, or the like to transmit a signal relating to provision of service. Here, the signal relating to provision of service can include an advertisement. In addition, the signal relating to provision of service according to the present embodiment includes various types of information transmitted by the reader 10. The reader 10 according to the present embodiment is capable of performing wireless communication with the wireless communication terminal 30 connected thereto on the basis of the advertisement mentioned above. In this event, the reader 10 according to the present embodiment performs wireless communication with the wireless communication terminal 30 using, in one example, Bluetooth low energy (BLE), or the like.

Here, the readers 10 according to the present embodiment can be wireless communication devices that correspond to the respective stages of service. In this event, the reader 10 according to the present embodiment has one feature that allows for transmitting a signal corresponding to a stage of service with the radio field intensity corresponding to this relevant stage. In other words, the reader 10 according to the present embodiment is capable of transmitting the advertisement corresponding to a stage of service to a communication coverage that is set for each of the relevant stages.

In one example, the reader 10c according to the present embodiment can be a first wireless communication device corresponding to a provision completion stage of service. Here, the provision completion stage can be, in one example, a delivery stage of an article. The reader 10c according to the present embodiment has a function of transmitting an advertisement corresponding to the delivery stage of an article with radio field intensity corresponding to this relevant stage. In this event, the reader 10c according to the present embodiment transmits the advertisement with radio field intensity that is lower than those of the readers 10a and 10b corresponding to other stages as illustrated in FIG. 1. In addition, the article mentioned above can include, in one example, goods ordered by a consumer, a deposit item that a customer deposits to receive service provision, or the like.

Further, the reader 10c according to the present embodiment has a function of releasing the locked state of the provision device 20 on the basis of service history information received from the wireless communication terminal 30 connected thereto on the basis of the advertisement. Here, the service history information can include, in one example, a payment log, or the like. In addition, the reader 10c according to the present embodiment has a function of transmitting additional information relating to service to the wireless communication terminal 30 connected thereto on the basis of the advertisement. Here, the additional information can include, in one example, receipt information, coupon information, reward point information, or the like. Details of functions of the reader 10c according to the present embodiment will be described later.

Further, the reader 10b according to the present embodiment can be a second wireless communication device corresponding to a preparation completion stage relating to service provision. Here, the preparation completion stage can be, in one example, a stage in which cooking of an article of goods is completed and preparation for provision is completed or the like. The reader 10b according to the present embodiment has a function of transmitting the advertisement corresponding to the preparation completion stage mentioned above with the radio field intensity corresponding to this relevant stage. In this event, as illustrated in FIG. 1, the reader 10b according to the present embodiment transmits the advertisement with radio field intensity that is higher than that of the reader 10c corresponding to the delivery stage.

Further, the reader 10b according to the present embodiment has a function of transmitting a preparation completion notification relating to service provision to the wireless communication terminal 30 connected thereto on the basis of the advertisement mentioned above. Details of functions of the reader 10b according to the present embodiment will be described later.

Further, the reader 10a according to the present embodiment can be a third wireless communication device corresponding to an order stage of service. Here, the order stage mentioned above can be, in one example, a stage in which a consumer selects goods from a menu in a store and makes an order. The reader 10a according to the present embodiment has a function of transmitting the advertisement corresponding to the order stage mentioned above with radio field intensity corresponding to this relevant stage. In this event, as illustrated in FIG. 1, the reader 10a according to the present embodiment transmits the advertisement with radio field intensity that is higher than that of the reader 10c corresponding to the delivery stage.

Further, the reader 10a according to the present embodiment has a function of transmitting menu information relating to the service to be provided to the wireless communication terminal 30 connected thereto on the basis of the advertisement mentioned above. In addition, the reader 10a according to the present embodiment has a function of receiving order information relating to service from the wireless communication terminal 30 connected thereto on the basis of the advertisement.

Furthermore, the reader 10a according to the present embodiment has a function of performing payment processing relating to the service to be provided with the wireless communication terminal 30 connected thereto on the basis of the advertisement mentioned above. Details of functions of the reader 10c according to the present embodiment will be described later.

(Provision Device 20)

Then, the provision device 20 according to the present embodiment is described. The provision device 20 according to the present embodiment has a function of providing service to a consumer. Thus, the provision device 20 according to the present embodiment has a function of releasing the locked state relating to service provision on the basis of the signal transmitted from the reader 10c in the provision completion stage of service.

More specifically, the provision device 20 according to the present embodiment can include, in one example, a container that stores goods or the like ordered by a consumer and a means of locking (locking means) this relevant container. In this case, the provision device 20 according to the present embodiment is capable of providing goods to the consumer by releasing the locked state of the container under the control of the reader 10c.

(Wireless communication terminal 30)

The wireless communication terminal 30 according to the present embodiment has a function of performing wireless communication with the readers 10a to 10c to transmit and receive various types of information. The wireless communication terminal 30 according to the present embodiment can communicate with the readers 10a to 10c via, in one example, BLE. In this event, the wireless communication terminal 30 according to the present embodiment is capable of establishing the connection with the readers 10*a* to 10*c* on the basis of the advertisement transmitted by the readers 10*a* to 10*c*.

Further, the wireless communication terminal 30 according to the present embodiment has a function of performing the payment processing with the reader 10*a*. Thus, the wireless communication terminal 30 according to the present embodiment can include a secure element (SE). Moreover, the wireless communication terminal 30 according to the present embodiment can be a mobile terminal owned by a consumer. The wireless communication terminal 30 according to the present embodiment can be, in one example, a mobile phone, a smartphone, a tablet computer, a wearable device, or the like.

The configuration example of the wireless communication system 1000 according to the present embodiment is described above. As described above, the wireless communication system 1000 according to the present embodiment has one feature that allows for including the plurality of readers 10 corresponding to the respective stages of service. In addition, the reader 10 according to the present embodiment has one feature that allows for transmitting the advertisement corresponding to the stage of service with radio field intensity corresponding to the relevant stage. The wireless communication system 1000 according to the present embodiment makes it possible to set a communication range depending on the stages of service and to implement information communication based on the communication range. Thus, it is possible to automate a series of processing relating to service provision using the general-purpose reader 10 at low cost without human intervention and to utilize effectively the space of a store.

Moreover, although the above description with reference to FIG. 1 is given of the case where the wireless communication system 1000 according to the present embodiment includes three readers 10*a* to 10*c* as an example, the number of the readers 10 according to the present embodiment is not limited to this example. The wireless communication system 1000 according to the present embodiment can, in one example, include two readers 10 or include four or more readers 10. The number of the readers 10 according to the present embodiment can be designed flexibly depending on the type of service to be applied.

Further, the above description with reference to FIG. 1 is given of the case where the reader 10*c* and the provision device 20 according to the present embodiment are provided as separate devices. On the other hand, the reader 10*c* and the provision device 20 according to the present embodiment can be implemented in a single device. The configuration of the wireless communication system 1000 according to the present embodiment can be changed flexibly depending on the specification and operation of service.

<<1.2. Functional Configuration Example of Reader 10>>

Figure 2:
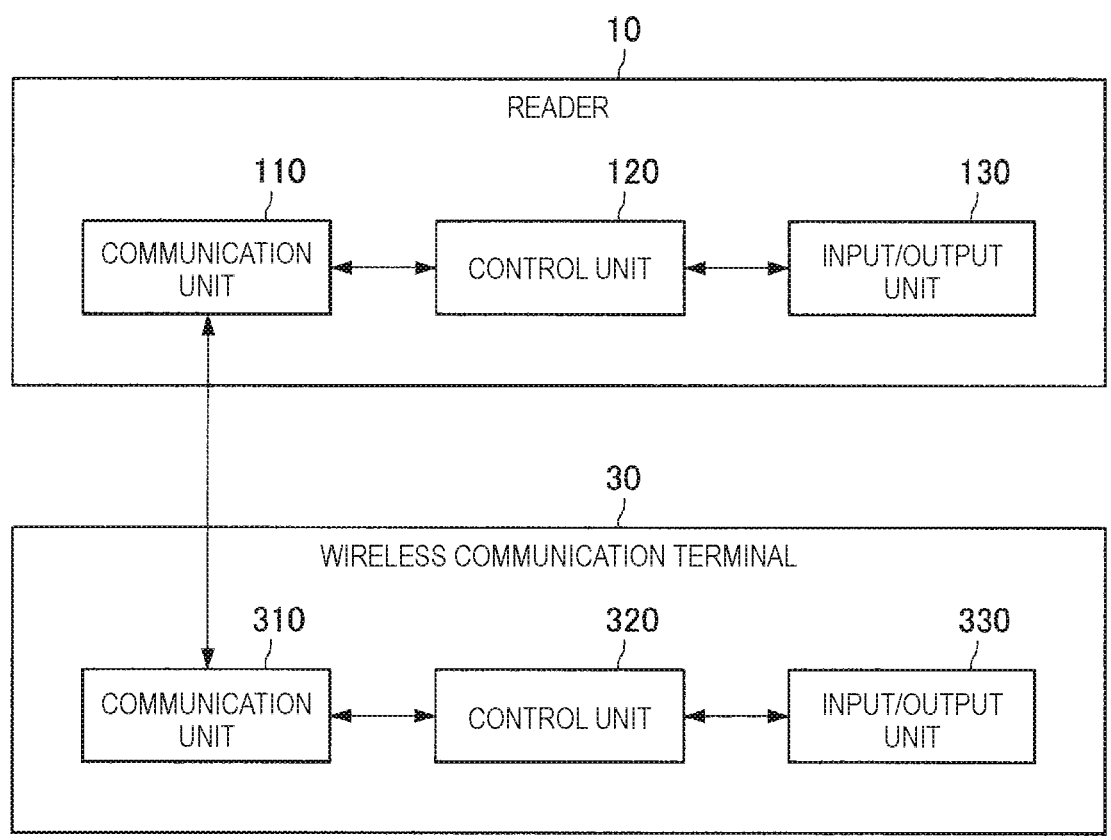
FIG. 2 is a functional block diagram of a reader and a wireless communication terminal according to the present embodiment.

Then, the functional configuration example of the reader 10 according to the present embodiment is described. FIG. 2 is a functional block diagram of the reader 10 and the wireless communication terminal 30 according to the present embodiment. Referring to FIG. 2, the reader 10 according to the present embodiment includes a communication unit 110, a control unit 120, and an input/output unit 130.

(Communication Unit 110)

The communication unit 110 has a function of performing wireless communication with the wireless communication terminal 30. The communication unit 110 according to the present embodiment transmits the advertisement corresponding to the stage of service with the radio field intensity corresponding to the relevant stage. In addition, the communication unit 110 has a function of transmitting various types of information relating to service provision to the wireless communication terminal 30 connected thereto on the basis of the advertisement mentioned above.

Specifically, the communication unit 110 according to the present embodiment is capable of transmitting the menu information, the preparation completion notification, the additional information, or the like relating to service to the wireless communication terminal 30. In addition, the communication unit 110 can receive the order information relating to service from the wireless communication terminal 30. Furthermore, the communication unit 110 transmits and receives information relating to service payment with the wireless communication terminal 30. Moreover, the communication unit 110 can perform cryptographic communication with the wireless communication terminal 30.

Further, the communication unit 110 has a function of transmitting a signal used to instruct the provision device 20 to release the locked state. In this event, the communication unit 110 can perform wireless communication or wired communication with the provision device 20.

(Control Unit 120)

The control unit 120 has a function of controlling the entire operation of the reader 10. Specifically, the control unit 120 can control contents, transmission frequency, or the like of the advertisement transmitted by the communication unit 110. In addition, the control unit 120 is capable of controlling the radio field intensity used for transmission of the advertisement mentioned above.

Further, the control unit 120 has a function of generating the menu information, preparation completion notification, additional information, and the like, which relate to the service, transmitted by the communication unit 110. In addition, the control unit 120 executes the payment processing relating to service on the basis of the information received by the communication unit 110.

Further, the control unit 120 can have a function of controlling input and output of the input/output unit 130. In one example, the control unit 120 can execute various processing on the basis of the information input from the input/output unit 130 and can output a result of the processing to the input/output unit 130.

(Input/Output Unit 130)

The input/output unit 130 has a function of receiving an input operation by the user. The function mentioned above can be implemented by, in one example, various buttons, levers, a keyboard, a mouse, a touch panel, and the like. In addition, the input/output unit 130 has a function of outputting various pieces of information under the control of the control unit 120. The function mentioned above can be implemented by, in one example, various display devices, speech output devices, light sources including light emitting diode (LED), or the like.

Further, the display device mentioned above can be implemented by, in one example, a cathode ray tube (CRT) display device, a liquid crystal display (LCD) device, an organic light emitting diode (OLED) device, or the like.

The functional configuration of the reader 10 according to the present embodiment is described above. Although the above description with reference to FIG. 2 is given of the case where the reader 10 includes the communication unit 110, the control unit 120, and the input/output unit 130, the functional configuration of the reader 10 according to the present embodiment is not limited to this example. The reader 10 according to the present embodiment can further include, in one example, a component other than that illustrated in FIG. 2. The reader 10 can further include, in one example, a storage unit or the like that holds various data used for the processing by the control unit 120.

Further, in one example, the reader 10 does not necessarily have either the input function or the output function of the input/output unit 130, or both functions. The functional configuration of the reader 10 according to the present embodiment can be changed flexibly depending on the specification and operation of service.

<<1.3. Functional Configuration Example of Wireless Communication Terminal 30>>

With continued reference to FIG. 2, the functional configuration example of the wireless communication terminal 30 according to the present embodiment is described. Referring to FIG. 2, the wireless communication terminal 30 according to the present embodiment includes a communication unit 310, a control unit 320, and an input/output unit 330.

(Communication Unit 310)

The communication unit 310 has a function of performing wireless communication with the reader 10. The communication unit 310 according to the present embodiment is capable of establishing the connection with the reader 10 on the basis of the advertisement transmitted by the reader 10. In addition, the communication unit 310 has a function of receiving various pieces of information relating to the service provision from the reader 10 connected thereto.

Specifically, the communication unit 310 according to the present embodiment receives the menu information, preparation completion notification, additional information, and the like, which relate to service, from the reader 10. In addition, the communication unit 310 has a function of transmitting the order information relating to service to the reader 10.

(Control Unit 320)

The control unit 320 has a function of controlling the entire operation of the wireless communication terminal 30. In one example, the control unit 320 controls the communication unit 310 to perform wireless communication. Specifically, the control unit 320 can generate order information on the basis of the input operation detected by the input/output unit 330 and cause the communication unit 310 to transmit the order information. In addition, the control unit 320 performs control so that the payment processing is performed with the reader 10.

Further, the control unit 320 controls an input or output relating to the input/output unit 330. In one example, the control unit 320 causes the input/output unit 330 to output the menu information, preparation completion notification, additional information, and the like received by the communication unit 310. In addition, the control unit 320 can execute various processing, in one example, on the basis of the information input from the input/output unit 330, and can cause the input/output unit 330 to output a result of the relevant processing.

(Input/Output Unit 330)

The input/output unit 330 has a function of receiving an input operation by a consumer. This function can be implemented by, in one example, various buttons, a keyboard, a touch panel, a microphone, or the like. The input/output unit 330 according to the present embodiment can receive, in one example, an order operation or the like by a consumer.

Further, the input/output unit 330 has a function of outputting various pieces of information under the control of the control unit 320. The input/output unit 330 according to the present embodiment can output, in one example, the menu information, preparation completion notification, additional information, and the like, which relate to service.

This function can be implemented by, in one example, various display devices, speech output devices, light sources including LED or the like, vibration generation devices, and the like. In addition, the display device mentioned above can be implemented by, in one example, a liquid crystal display device, an OLED device, or the like.

The functional configuration of the wireless communication terminal 30 according to the present embodiment is described above. Although the above description with reference to FIG. 2 is given of the case where the wireless communication terminal 30 includes the communication unit 310, the control unit 320, and the input/output unit 330, the functional configuration of the wireless communication terminal 30 according to the present embodiment is not limited to this example. The wireless communication terminal 30 according to the present embodiment can further include, in one example, a component other than that illustrated in FIG. 2. The wireless communication terminal 30 can further include, in one example, a storage unit or the like that holds various data used for the processing by the control unit 320. The functional configuration of the wireless communication terminal 30 according to the present embodiment can be changed flexibly depending on the specification and operation of service.

<<1.4. Operation of Wireless Communication System 1000>>

Then, the operation of the wireless communication system 1000 according to the present embodiment is described in detail while giving a specific example. The following description is given of a case where the wireless communication system 1000 according to the present embodiment is applied to provision of service in a coffee shop or a food court as an example. Here, this service can include a goods order stage, a preparation completion stage, and a provision completion stage (a delivery stage).

(Operation in Order Stage)

Figure 3:
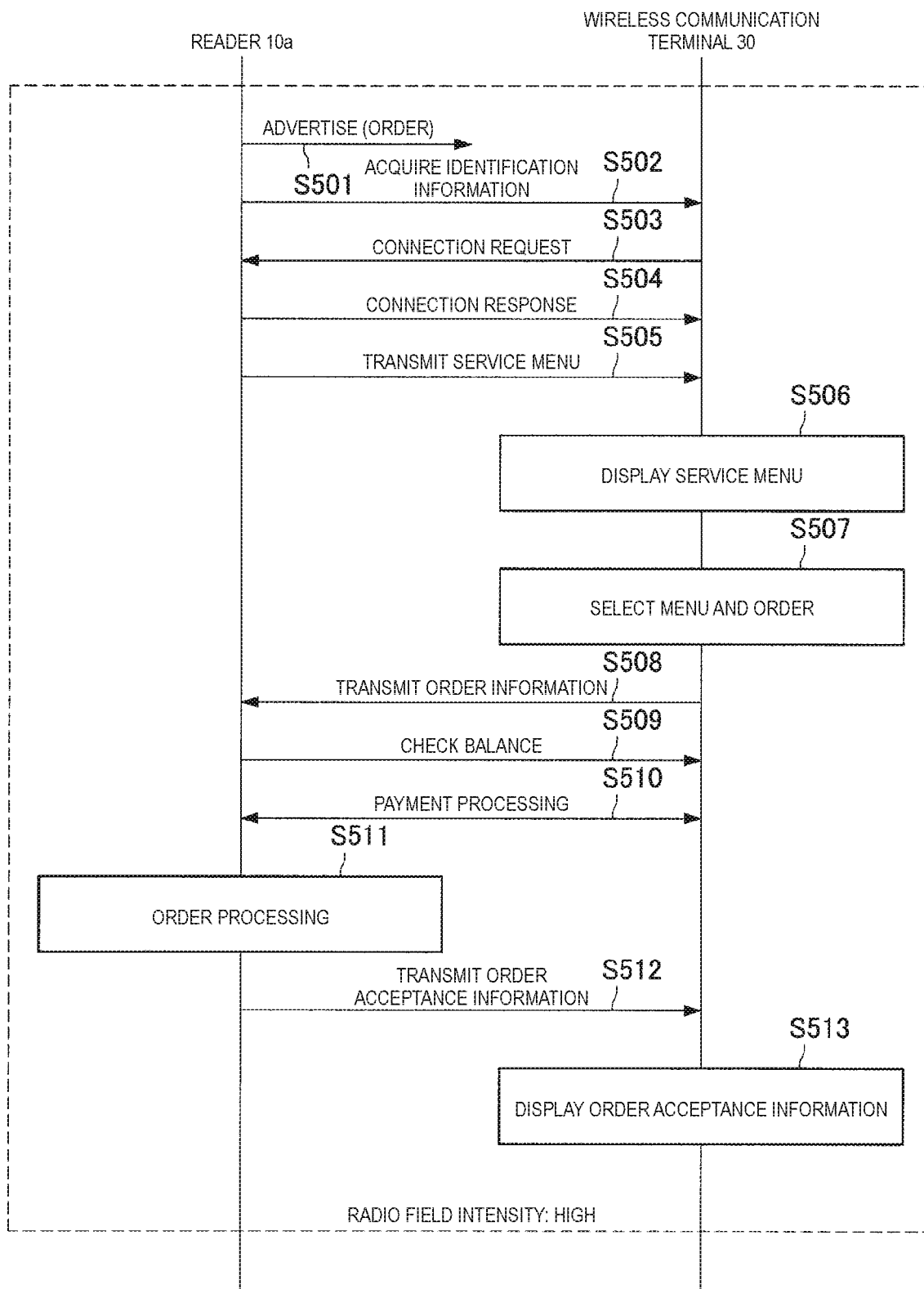
FIG. 3 is a sequence diagram illustrating the processing flow of a wireless communication system and the wireless communication terminal in an order stage according to the present embodiment.

The operation of the wireless communication system 1000 in the goods order stage is first described with reference to FIG. 3. FIG. 3 is a sequence diagram illustrating the processing flow of the wireless communication system 1000 and the wireless communication terminal 30 in the order stage. Referring to FIG. 3, first, the reader 10*a* according to the present embodiment transmits an advertisement corresponding to the order stage (S501). In this event, the reader 10*a* can transmit the advertisement with the radio field intensity corresponding to the order stage. In one example, the reader 10*a* is capable of transmitting the advertisement with a communication range of zero to several tens of meters. In this way, the reader 10*a* that transmits the advertisement with relatively high radio field intensity allows a consumer who visits a store to make an order for goods while sitting in the seat. Thus, the plurality of readers 10*a* according to the present embodiment can be installed, in one example, on the ceiling or the like of the store.

Then, the wireless communication terminal 30 acquires identification information from the advertisement transmitted in step S501 (S502). Here, the identification information acquired in step S502 can be, in one example, a universally unique identifier (UUID) or the like used for identification of service.

Subsequently, the wireless communication terminal 30 issues a connection request to the reader 10*a* on the basis of the identification information acquired in step S502 (S503).

Then, the reader 10*a* executes a connection response to the connection request issued in step S503 (S504). The connection request in step S503 and the connection response in step S504 allow the wireless communication between the reader 10*a* and the wireless communication terminal 30 to be established. Moreover, in this event, the wireless communication terminal 30 can notify the consumer that the connection is established by turning on a light source or generating vibration.

In the case where the wireless communication between the reader 10*a* and the wireless communication terminal 30 is established, then the reader 10*a* transmits a service menu to the wireless communication terminal 30 (S505).

Figure 4:
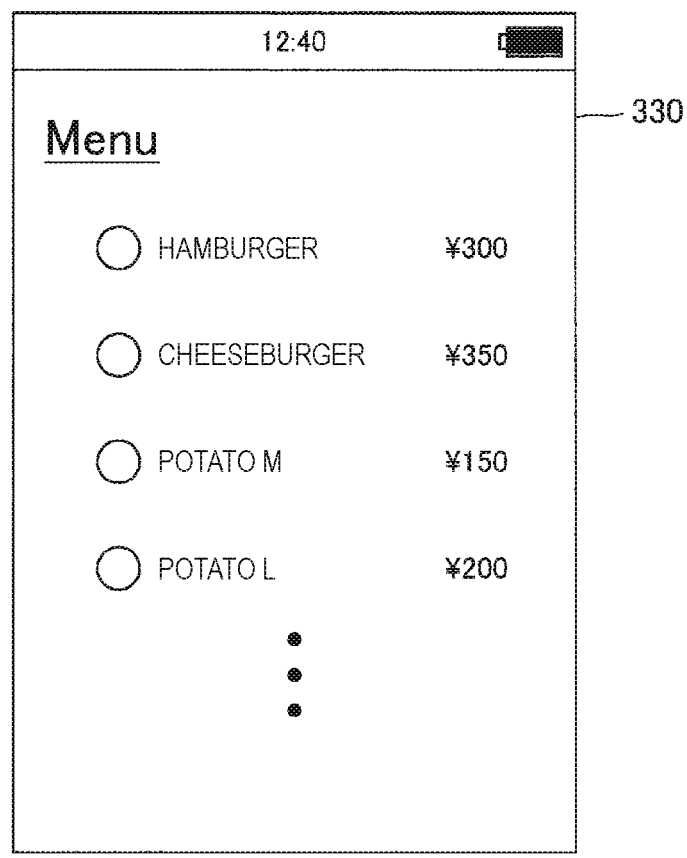
FIG. 4 is a diagram illustrating an example of a service menu that is output by an input/output unit of the wireless communication terminal according to the present embodiment.

The wireless communication terminal 30, when receiving the service menu transmitted in step S505, displays the relevant service menu (S506). FIG. 4 is a diagram illustrating an example of a service menu that is output by the input/output unit 330 of the wireless communication terminal 30. FIG. 4 illustrates menu information displayed on the input/output unit 330 of the wireless communication terminal 30. In this way, the transmission of the menu information of the store by the reader 10*a* installed in a store to the wireless communication terminal 30 makes it possible for a customer to confirm the menu information through the wireless communication terminal 30 owned by the customer at any place in the store.

Figure 5:
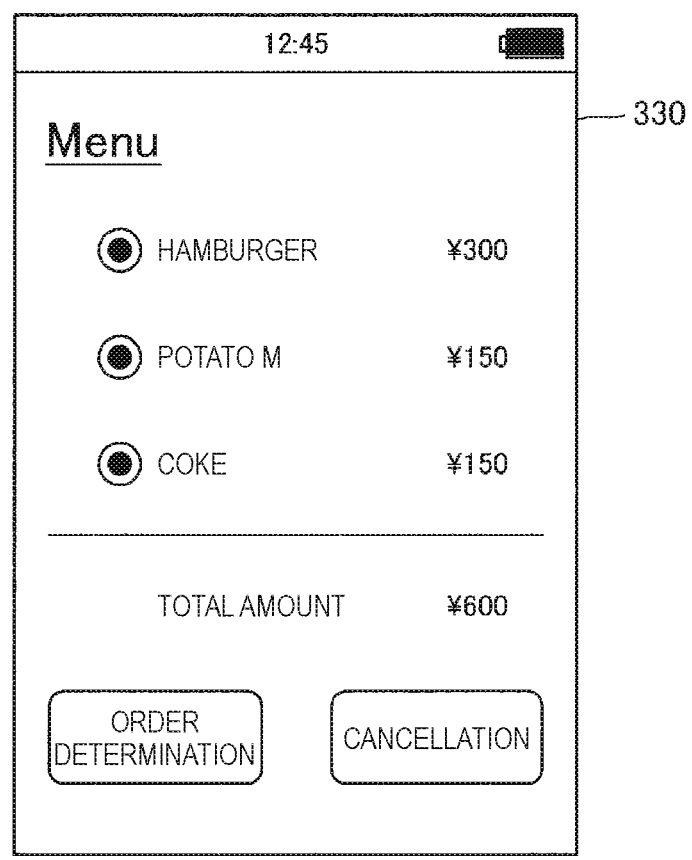
FIG. 5 is a diagram illustrating an example of an order confirmation screen that is output by the input/output unit of the wireless communication terminal according to the present embodiment.

Subsequently, the wireless communication terminal 30 determines the menu selection and order on the basis of the operation of the consumer (S507). FIG. 5 illustrates an example of an order confirmation screen displayed on the input/output unit 330 of the wireless communication terminal 30. As illustrated in FIG. 5, the input/output unit 330 can display a name, total amount, or the like of the menu selected on the basis of the input operation by the consumer. In addition, as illustrated in FIG. 5, the input/output unit 330 can also display a button relating to determination of an order, a cancellation button, and the like. The consumer confirms the information displayed on the input/output unit 330 or performs the determination operation or the like, and so the order can be made without going to the order window.

The description continues with reference to FIG. 3. In a case where the consumer executes the order operation through the input/output unit 330, the wireless communication terminal 30 transmits the determined order information to the reader 10*a* (S508).

Then, the reader 10*a* checks the balance with the wireless communication terminal 30 on the basis of the received order information (S509).

Here, in a case where the balance exceeds the order amount, the payment processing is executed between the reader 10*a* and the wireless communication terminal 30 (S510).

Upon completion of the payment processing, the reader 10*a* executes the order processing on the basis of the order information received in step S508 (S511). Here, the order processing mentioned above can be, in one example, the processing of informing a cooking staff of contents of the order by displaying the order information on the input/output unit 330 or the processing of instructing a cooking unit to start cooking.

Upon completion of the order processing, the reader 10*a* subsequently transmits order acceptance information to the wireless communication terminal 30 (S512).

Figure 6:
FIG. 6 is a diagram illustrating an example of order acceptance information that is output by the input/output unit of the wireless communication terminal according to the present embodiment.

Then, the wireless communication terminal 30, when receiving the order acceptance information, displays the order acceptance information on the input/output unit 330 (S513). FIG. 6 is an example of the order acceptance information displayed on the input/output unit 330 of the wireless communication terminal 30. As illustrated in FIG. 6, the order acceptance information according to the present embodiment can include, in one example, an identification number such as an order number. The order acceptance information including the order number makes it possible for the consumer not only to recognize that the order is accepted but also to use it in a case where making an inquiry to the store.

Further, as illustrated in FIG. 6, the order acceptance information according to the present embodiment can include, in one example, information such as an estimated delivery time for goods. The order acceptance information including the estimated delivery time for goods makes it possible for the consumer to recognize the time it takes to be delivered. For this reason, it is expected that the user is able to effectively utilize time it takes for the user to leave the store and to finish another business, and at the same time, to effectively utilize the limited space in the store.

(Operation in Preparation Completion Stage)

Figure 7:
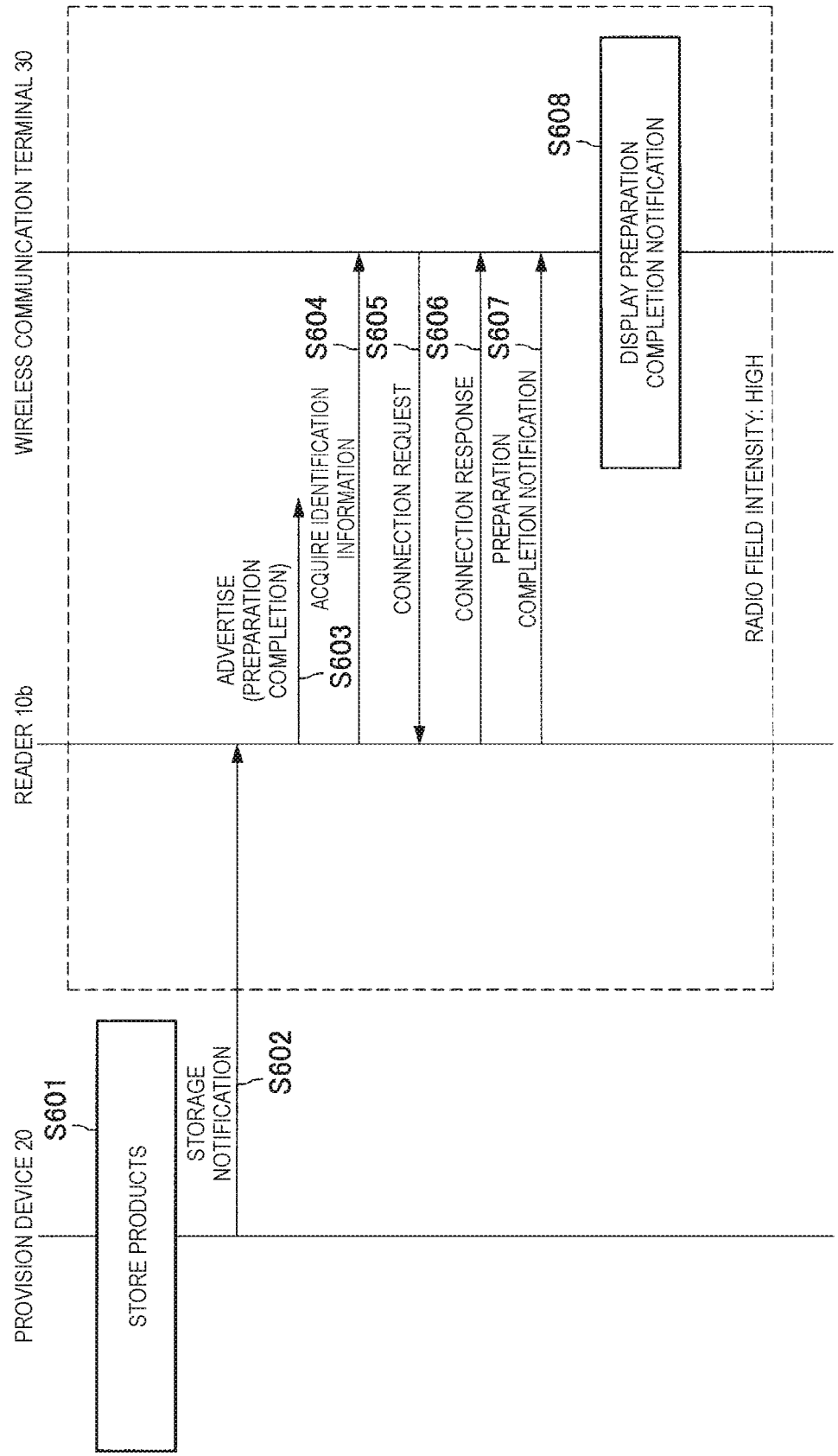
FIG. 7 is a sequence diagram illustrating the processing flow of the wireless communication system and the wireless communication terminal in a preparation completion stage according to the present embodiment.

Then, the operation of the wireless communication system 1000 and the wireless communication terminal 30 in the preparation completion stage according to the present embodiment is described. FIG. 7 is a sequence diagram illustrating the processing flow of the wireless communication system 1000 and the wireless communication terminal 30 in the order stage.

Referring to FIG. 7, first, goods are stored in the provision device 20 according to the present embodiment (S601). The storage of goods in step S601 can be performed through human intervention, such as a cooking staff, or can be automatically performed by a cooking unit. Moreover, the provision device 20 makes transition to the locked state after storing the goods.

Upon completion of storage of the goods in step S601, the provision device 20 transmits a notification of storage to the reader 10*b* (S602). In this event, the notification of storage can be transmitted using wireless communication or wired communication.

Then, the reader 10*b*, when receiving the notification of storage, transmits an advertisement corresponding to the preparation completion stage (S603). In this event, the reader 10*b* can transmit the advertisement with the radio field intensity corresponding to the preparation completion stage. In one example, the reader 10*b* can transmit the advertisement with the communication range of zero to several tens of meters. In this way, the reader 10*b* that transmits the advertisement with relatively high radio field intensity makes it possible to inform the consumer that preparation for provision of goods is completed even in a case where the consumer is not in the vicinity of the goods delivery window. Thus, the plurality of the reader 10*b* according to the present embodiment can be installed, in one example, on the ceiling or the like of the store.

Then, the wireless communication terminal 30 acquires identification information from the advertisement transmitted in step S603 (S604).

Subsequently, the wireless communication terminal 30 issues a connection request to the reader 10*b* on the basis of the identification information acquired in step S604 (S605).

Then, the reader 10*b* executes a connection response to the connection request issued in step S605 (S606). The connection request in step S605 and the connection response in step S606 allow the wireless communication between the reader 10*b* and the wireless communication terminal 30 to be established. In this event, the wireless communication terminal 30 can notify the consumer that the connection is established by turning on a light source or generating vibration.

In a case where the wireless communication between the reader 10*b* and the wireless communication terminal 30 is established, the reader 10*b* subsequently transmits a preparation completion notification to the wireless communication terminal 30 (S607).

Figure 8:
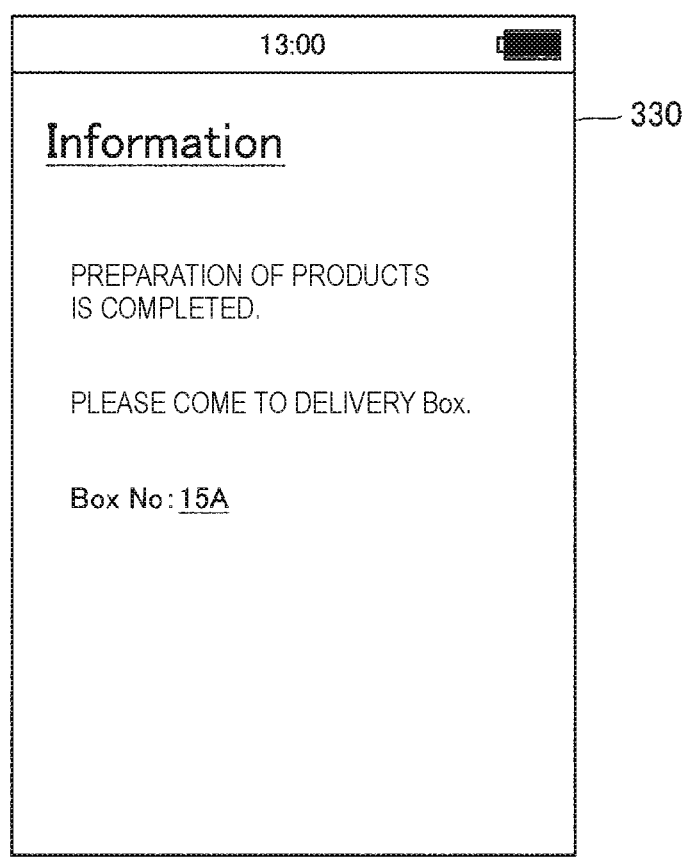
FIG. 8 is a diagram illustrating an example of a preparation completion notification that is output by the input/output unit of the wireless communication terminal according to the present embodiment.

The wireless communication terminal 30, when receiving the preparation completion notification transmitted in step S607, displays the preparation completion notification on the input/output unit 330 (S608). FIG. 8 is a diagram illustrating an example of the preparation completion notification that is output by the input/output unit 330 of the wireless communication terminal 30. As illustrated in FIG. 8, the preparation completion notification according to the present embodiment can include a message indicating the fact that preparation for provision of goods is completed or information used to specify the provision device 20 used for delivery of goods. In the example illustrated in FIG. 8, the information used to specify the provision device 20 is shown as "Box No: 15A". The consumer can specify the provision device 20 used for delivery of goods by confirming the information displayed on the input/output unit 330. Moreover, although not illustrated in FIG. 8, the preparation completion notification according to the present embodiment can include a map or the like indicating the position of the provision device 20 used for delivery.

(Operation in Provision Completion Stage)

Figure 9:
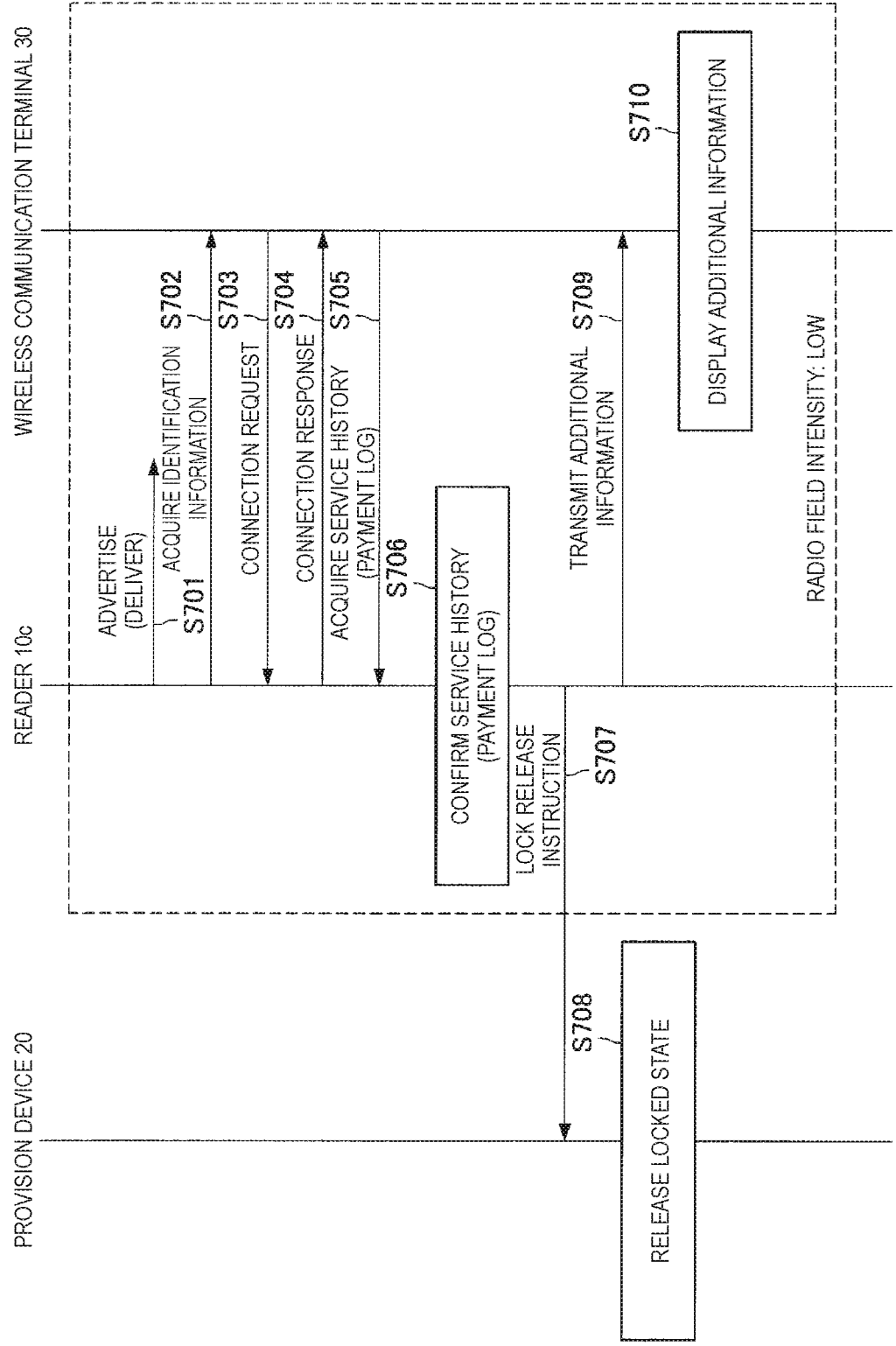
FIG. 9 is a sequence diagram illustrating the processing flow of the wireless communication system and the wireless communication terminal in a provision completion stage according to the present embodiment.

Then, the operation of the wireless communication system 1000 and the wireless communication terminal 30 in the provision completion stage according to the present embodiment is described. FIG. 9 is a sequence diagram illustrating the processing flow of the wireless communication system 1000 and the wireless communication terminal 30 in the provision completion stage.

Referring to FIG. 9, first, the reader 10*c* according to the present embodiment transmits an advertisement corresponding to the provision completion stage (S701). In this event, the reader 10*c* can transmit the advertisement with the radio field intensity corresponding to the provision completion stage. In one example, the reader 10*c* is capable of transmitting the advertisement with a communication range of zero to several tens of centimeters. The transmission of the advertisement with relatively low radio field intensity makes it possible for the reader 10*c* to deliver the goods only in a case where the owner who possesses the wireless communication terminal 30 exists near the provision device 20.

Then, the wireless communication terminal 30 acquires identification information from the advertisement transmitted in step S701 (S702).

Subsequently, the wireless communication terminal 30 issues a connection request to the reader 10*c* on the basis of the identification information acquired in step S702 (S703).

Then, the reader 10*c* executes a connection response to the connection request issued in step S703 (S704). The connection request in step S703 and the connection response in step S704 allow the wireless communication between the reader 10*c* and the wireless communication terminal 30 to be established. In this event, the wireless communication terminal 30 can notify the consumer that the connection is established by turning on a light source or generating vibration.

In a case where the wireless communication between the reader 10*c* and the wireless communication terminal 30 is established, the reader 10*c* subsequently acquires service history information from the wireless communication terminal 30 (S705). Here, the service history information acquired in step S705 can include a payment log. In addition, the payment log according to the present embodiment can include information such as payment date and time, amount paid, payment number, and the like.

Subsequently, the reader 10*c* refers to the payment log acquired in step S705 and decides whether or not the payment relating to goods is completed (S706). Here, upon confirming that payment is completed, the reader 10*c* transmits a lock release instruction to the provision device 20 (S707). The decision in the step S706 and the lock release instruction in the step S707 make it possible for the reader 10*c* to deliver goods to the consumer without human intervention.

Figure 10:
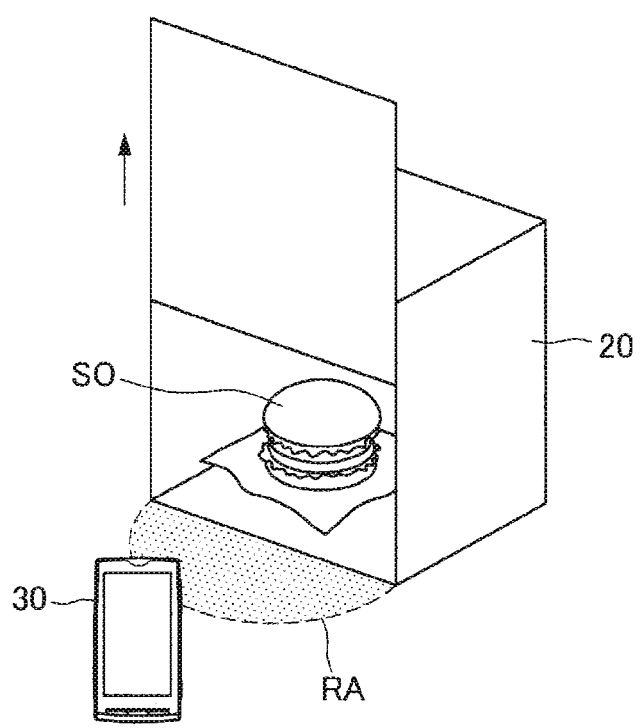
FIG. 10 is a diagram illustrated to describe release of a locked state in a provision device according to the present embodiment.

Then, the provision device 20, when receiving the lock release instruction, releases the locked state of a container in which goods are stored (S708). FIG. 10 is a diagram illustrated to describe the release of the locked state in the provision device 20 according to the present embodiment. FIG. 10 illustrates how the reader 10*c* (not shown) releases the locked state of the provision device 20 on the basis of the payment log acquired from the wireless communication terminal 30 connected thereto on the basis of the advertisement transmitted with low radio field intensity.

As illustrated in FIG. 10, the reader 10*c* according to the present embodiment is capable of setting a communication coverage RA only in the vicinity of the provision device 20 by transmitting the advertisement with low radio field intensity. The communication coverage RA that is set as illustrated in FIG. 10 makes it possible for the reader 10*c* to release the locked state of the provision device 20 only in a case where the consumer who possesses the wireless communication terminal 30 approaches the vicinity of the provision device 20, thereby reliably delivering goods SO to the consumer.

Figure 11:
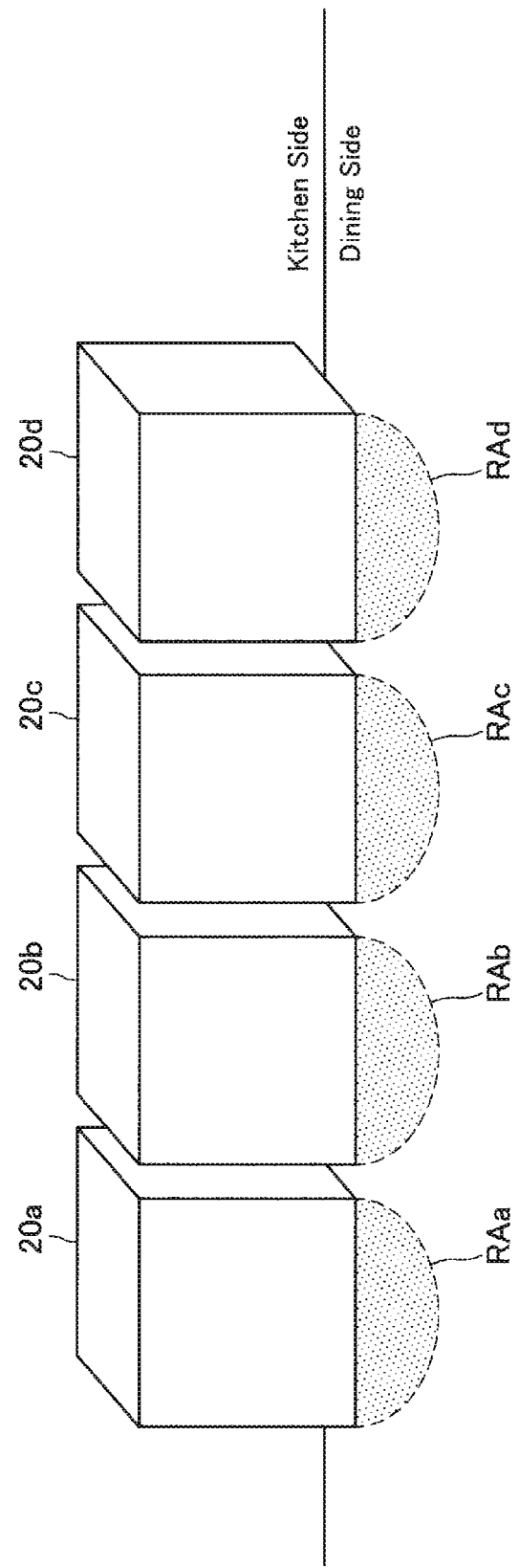
FIG. 11 is a diagram illustrated to describe communication coverage in a case where the wireless communication system according to the present embodiment includes a plurality of provision devices.

Moreover, the wireless communication system 1000 according to the present embodiment can include a plurality of provision devices 20. FIG. 11 is a diagram illustrated to describe the communication coverage RA in a case where the wireless communication system 1000 according to the present embodiment includes a plurality of provision devices 20. FIG. 11 illustrates a plurality of provision devices 20*a* to 20*d* and provision-capable ranges RAa to RAd corresponding respectively to the provision devices 20*a* to 20*d*. In this event, the provision-capable range RAa to RAd can be set within a range that can avoid mutual interference as illustrated in FIG. 11. In this way, the wireless communication system according to the present embodiment is capable of setting the provision-capable ranges RAa to RAd appropriate respectively to the provision devices 20*a* to 20*d*, thereby reliably delivering customer purchased goods to the consumer while simultaneously responding to a plurality of consumers.

As illustrated in FIG. 11, the provision device 20 according to the present embodiment can be arranged at the boundary between the kitchen side and the dining side. This arrangement of the provision device 20 as illustrated in FIG. 11 makes it possible to efficiently store the goods by the staff on the kitchen side and take out the goods by the consumer on the dining side.

Figure 12:
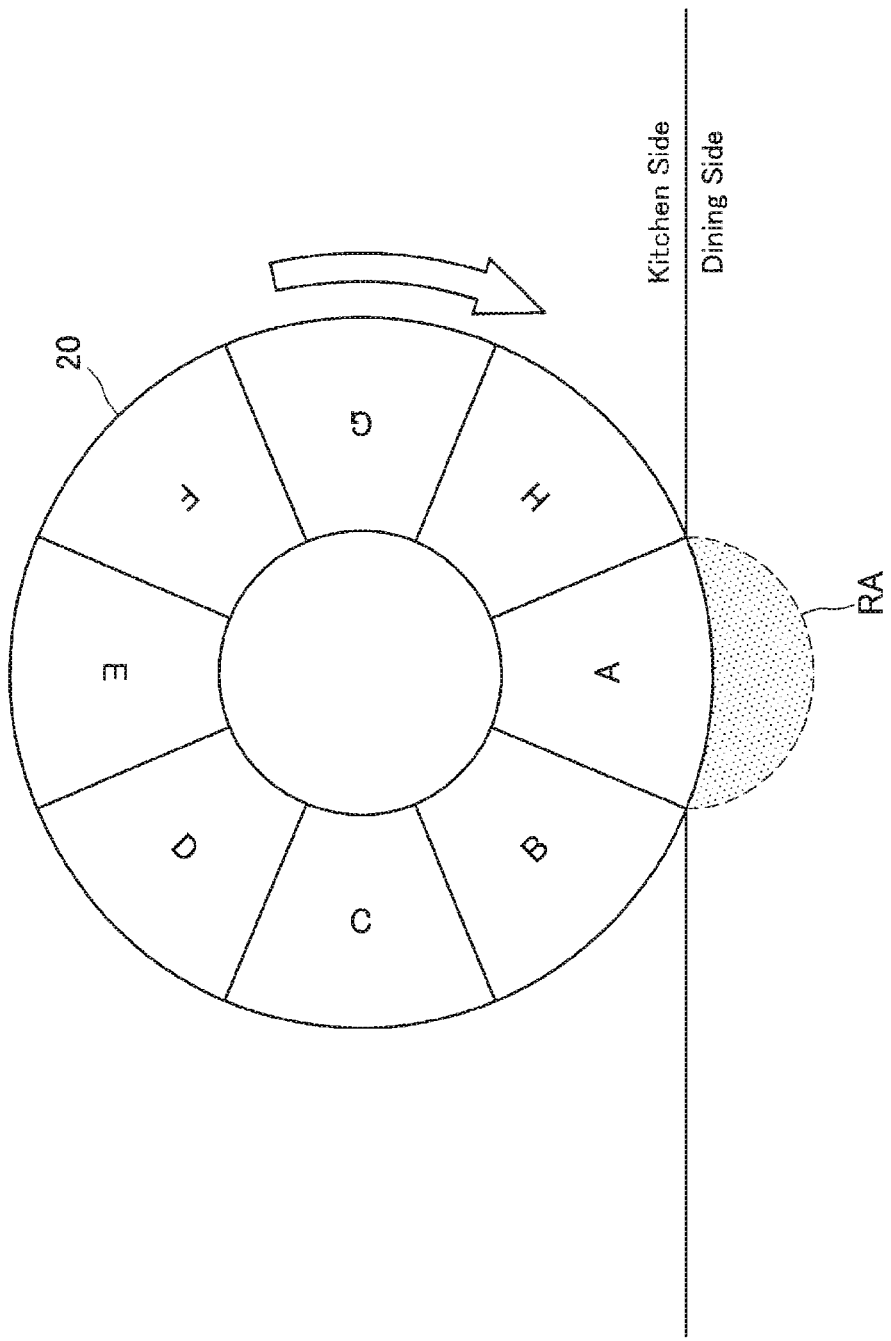
FIG. 12 is a diagram illustrating an example of a provision device equipped with a plurality of containers according to the present embodiment.

Further, the provision device 20 according to the present embodiment can include a plurality of containers. FIG. 12 is a diagram illustrating an example of the provision device 20 including a plurality of containers. FIG. 12 illustrates the provision device 20 including a plurality of containers A to H and the communication coverage RA that is set in the provision device 20. The provision device 20 illustrated in FIG. 12 can rotate the containers A to H on the basis of the lock release instruction received from the reader 10*c* and can performs control in such a way that a container that stores the relevant goods is arranged on the dining side. In this event, the lock release instruction received by the provision device 20 can include information used to specify the relevant container. As described above, the provision device 20 according to the present embodiment including a plurality of containers makes it possible to utilize effectively the limited space of the store.

The description continues by referring again to FIG. 9. Upon confirming the payment log in step S706, the reader 10c subsequently transmits additional information relating to service provision to the wireless communication terminal 30 (S709).

Figure 13:
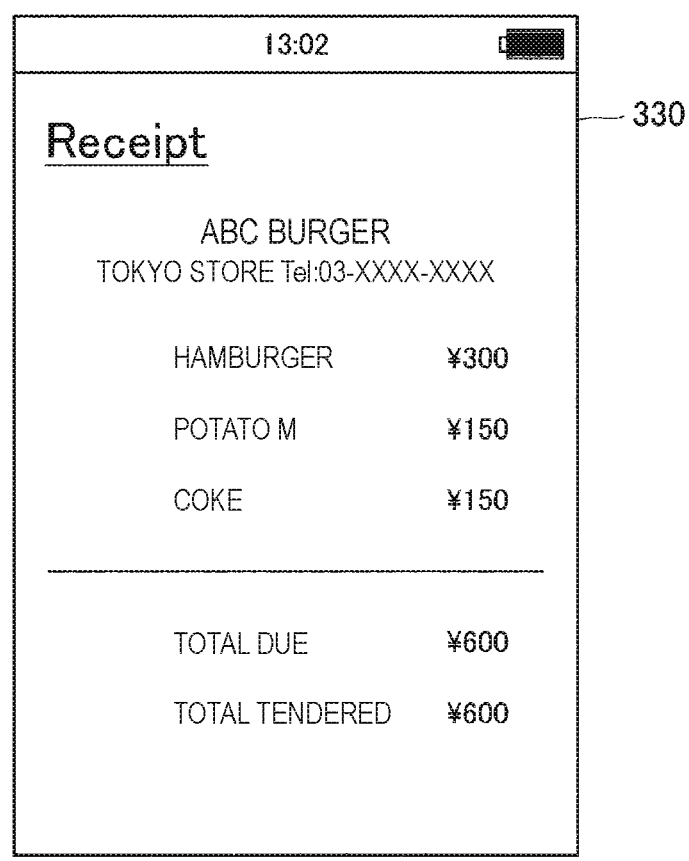
FIG. 13 is a diagram illustrating an example of additional information displayed by the input/output unit of the wireless communication terminal according to the present embodiment.

Then, the wireless communication terminal 30 displays the received additional information on the input/output unit 330 (S710). FIG. 13 is a diagram illustrating an example of additional information displayed on the input/output unit 330 of the wireless communication terminal 30. FIG. 13 shows an electronic receipt for goods purchased by a consumer. In this way, the additional information according to the present embodiment can include receipt information. In addition, the additional information according to the present embodiment can include coupon information, reward point information, warranty information, and the like, in addition to the receipt information illustrated in FIG. 13. The additional information according to the present embodiment can include various pieces of information relating to service provision. The transmission of the additional information as described above to the wireless communication terminal 30 by the reader 10c according to the present embodiment is expected to enhance an effect the added value of the service.

<<1.5. Modification>>

Then, a modification according to the present embodiment is described. The above description is given of the case where the reader 10 according to the present embodiment is Peripheral and the wireless communication terminal 30 is Central as an example. On the other hand, the roles of Peripheral and Central according to the present embodiment can be opposite to the above. In other words, in the present embodiment, the wireless communication terminal 30 can be Peripheral and the reader 10 can be Central.

In this case, the wireless communication terminal 30 according to the present embodiment can have a function of transmitting a signal corresponding to the stage of service with radio field intensity corresponding to the relevant stage. Specifically, the communication unit 310 of the wireless communication terminal 30 is capable of transmitting a signal relating to a request for service with the radio field intensity corresponding to each stage.

In other words, the communication unit 310 of the wireless communication terminal 30 transmits the advertisement with high radio field intensity in the order stage of service, and receives a signal including information such as a service menu from the reader 10a connected thereto on the basis of the relevant advertisement.

Further, the communication unit 310 of the wireless communication terminal 30 transmits the advertisement with high radio field intensity in the preparation completion stage of service and receives a signal including information such as a preparation completion notification from the reader 10b connected thereto on the basis of the relevant advertisement.

Further, the communication unit 310 of the wireless communication terminal 30 transmits the advertisement with low radio field intensity in the provision completion stage of service and receives a signal including additional information and the like from the reader 10c connected thereto on the basis of the relevant advertisement.

In other words, the wireless communication terminal 30 according to the present embodiment can have a function of controlling the radio field intensity in transmitting the advertisement depending on the stage of service. This function of the wireless communication terminal 30 makes it possible for the side of the mobile terminal possessed by the consumer to control the communication range and to implement the reader 10 or the like installed on the store side as a more general-purpose device.

On the other hand, the roles of Peripheral and Central according to the present embodiment can be switched depending on the stage of service. In one example, in the order stage or the preparation completion stage of service, the communication is performed with high radio field intensity, that is, wide communication range, so a plurality of wireless communication terminals 30 are more likely to be connected to a single reader 10 in each stage mentioned above.

Thus, in the order stage or the preparation completion stage of service, the wireless communication terminal 30 plays the role of Peripheral and the reader 10 plays the role of Central, so the efficiency of communication processing can be improved.

On the other hand, in the provision completion stage of service, the communication is performed with low radio field intensity, that is, narrow radio field intensity, so in this stage, the single wireless communication terminal 30 is connected to the single reader 10. Thus, in the provision completion stage of service, the reader 10 plays the role of Peripheral and the wireless communication terminal 30 plays the role of Central, so the efficiency of communication processing can be improved.

As described above, the roles of Peripheral and Central according to the present embodiment are not fixed, and can be flexibly changed depending on the specification and operation of service. The technical idea according to the present embodiment is widely applicable to various types of service.

2. SECOND EMBODIMENT

<<2.1. Configuration Example of Wireless Communication System 1000>>

Then, a second embodiment of the present disclosure is described. The above description in the first embodiment is given of the case where the payment processing relating to service is executed between the reader 10 and the wireless communication terminal 30. On the other hand, the second embodiment of the present disclosure has one feature that allows for performing the payment processing mentioned above in on-line state. The feature of the wireless communication system 1000 according to the present embodiment mentioned above makes it possible to further simplify communication between the reader 10 and the wireless communication terminal 30, thereby significantly reducing the construction cost for each store.

The configuration of the wireless communication system 1000 according to the present embodiment is described below in detail. Moreover, the following description of the present embodiment is mainly given of the difference from the first embodiment, and the detailed description of the configuration and function common to the first embodiment is omitted.

Figure 14:
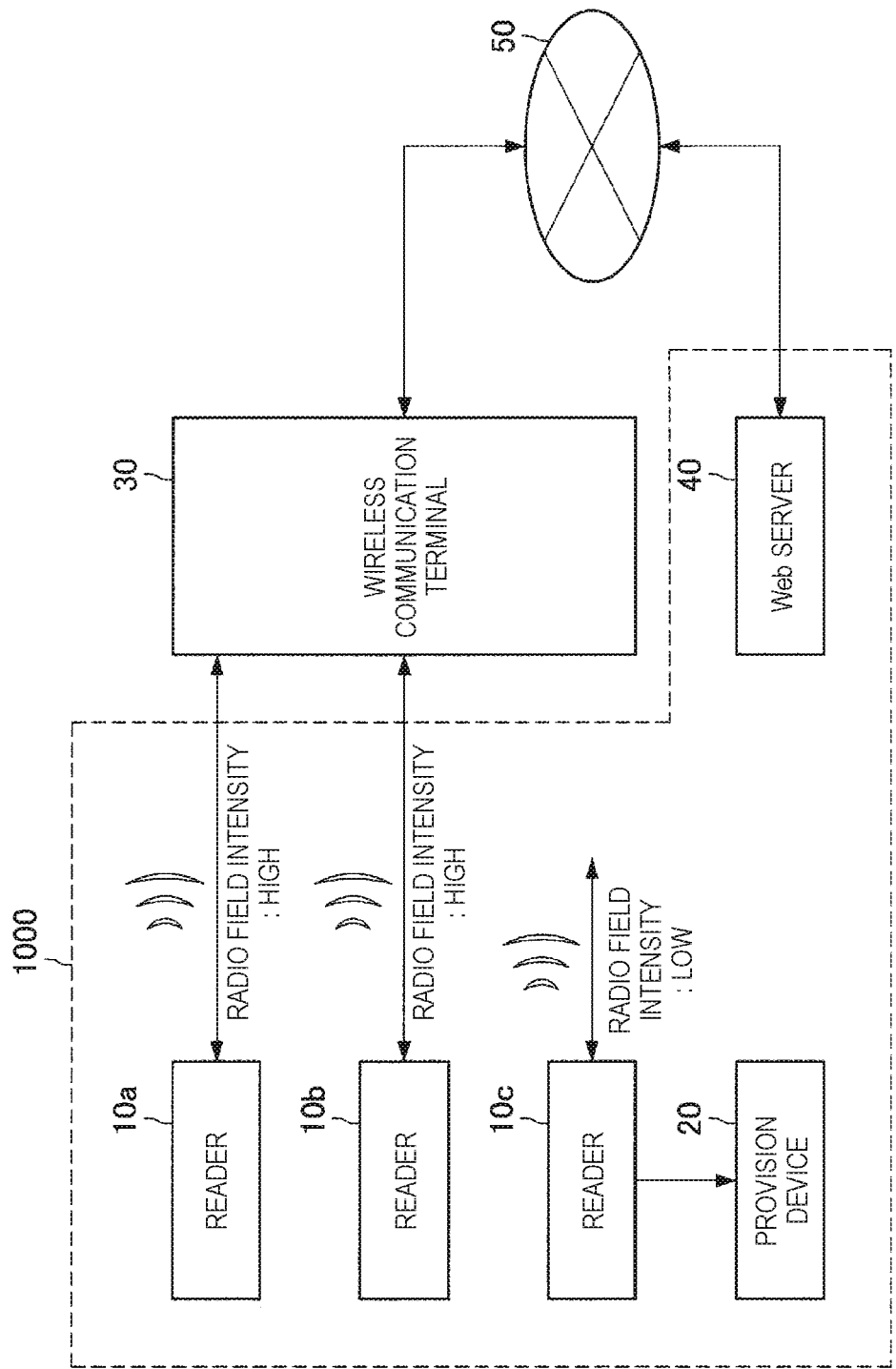
FIG. 14 is a diagram illustrating a configuration example of a wireless communication system according to a second embodiment of the present disclosure.

FIG. 14 is a diagram illustrating a configuration example of a wireless communication system 1000 according to the present embodiment. Referring to FIG. 14, the wireless communication system 1000 according to the present embodiment further includes a Web server 40 in addition to the plurality of readers 10a to 10c and the provision device 20. In addition, the Web server 40 is connected to the wireless communication terminal 30 via a network 50.

(Web Server 40)

The Web server 40 according to the present embodiment has a function of providing content in response to a request from the wireless communication terminal 30. More specifically, the Web server 40 according to the present embodiment has a function of transmitting menu information relating to service to the wireless communication terminal 30 on the basis of store information transmitted from the wireless communication terminal 30. In this event, the Web server 40 is capable of transmitting menu information specific to each store on the basis of the store information.

Further, the Web server 40 according to the present embodiment has a function of performing payment processing relating to service with the wireless communication terminal 30 on the basis of the store information. In this event, the Web server is capable of specifying a store subject to payment on the basis of the store information.

Moreover, the Web server 40 according to the present embodiment can be a server corresponding to a plurality of stores. Installation of at least one Web server 40 according to the present embodiment for a plurality of stores makes it possible to concentrate a menu provision function and a payment function of service and to reduce the construction cost for each store.

(Network 50)

The network 50 has a function of connecting the wireless communication terminal 30 and the Web server 40. The network 50 can include a public line network such as the Internet, telephone networks, and satellite communication networks, or various local area networks (LANs) and wide area networks (WANs) including Ethernet (registered trademark), or the like. In addition, the network 50 can include a leased line network such as Internet protocol-virtual private network (IP-VPN). In addition, the network 50 can include a wireless communication network such as Wi-Fi (registered trademark) or Bluetooth.

<<2.2. Operation of Wireless Communication System 1000>>

Figure 15:
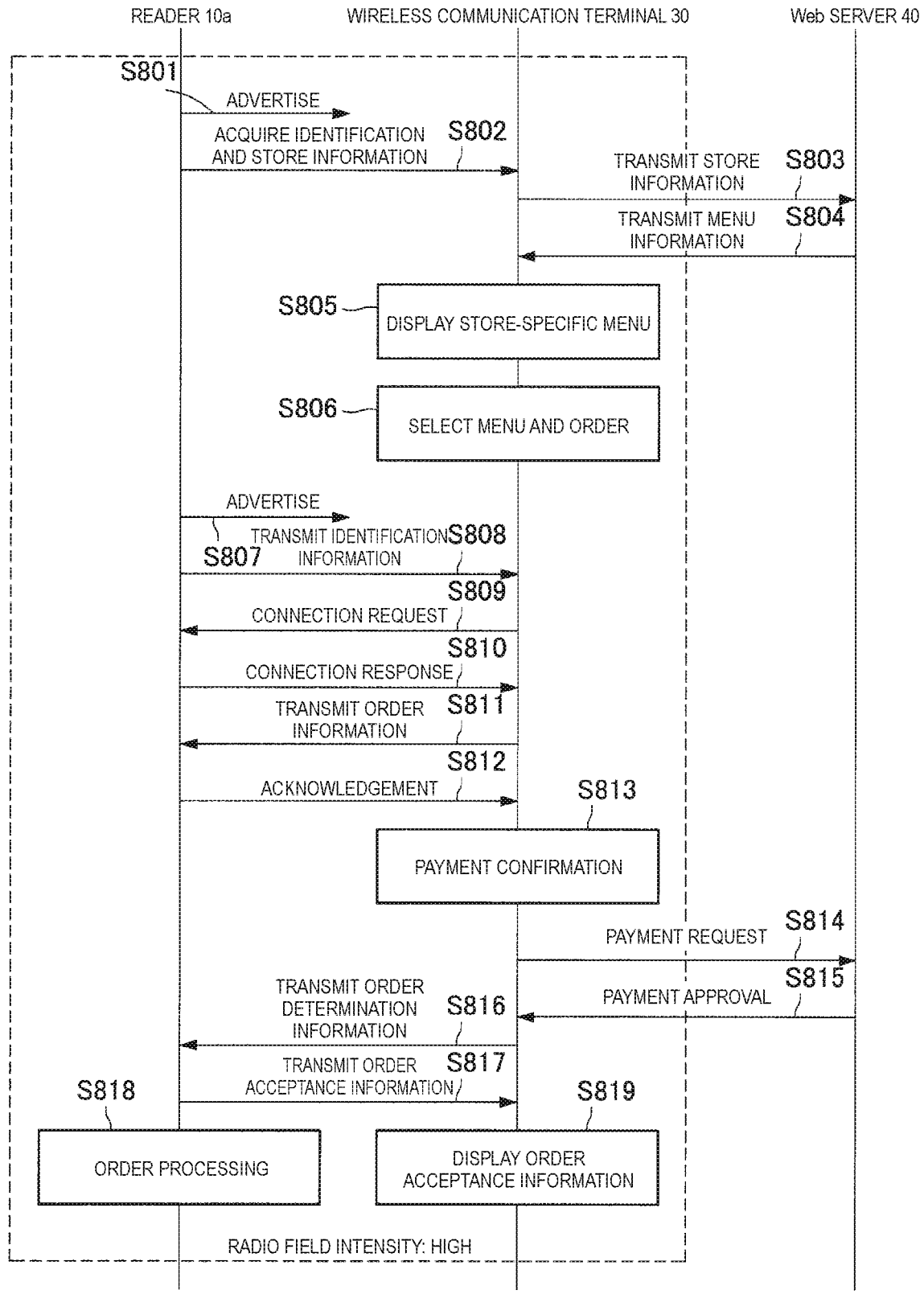
FIG. 15 is a sequence diagram illustrating the processing flow of the wireless communication system and a wireless communication terminal in the order stage according to the present embodiment.

Then, the operation of the wireless communication system according to the present embodiment is described in detail while giving a specific example. FIG. 15 is a sequence diagram illustrating the processing flow of the wireless communication system 1000 and the wireless communication terminal 30 in the order stage.

Referring to FIG. 15, first, the reader 10a according to the present embodiment transmits an advertisement corresponding to the order stage (S801). In this event, the reader 10a can transmit the advertisement mentioned above with high radio field intensity corresponding to the order stage, which is similar to the first embodiment.

Then, the wireless communication terminal 30 acquires identification information and store information from the advertisement transmitted in step 801 (S802). In this way, the reader 10a according to the present embodiment has a function of transmitting the store information used to specify a store that provides service. This function of the reader 10a makes it possible for the wireless communication terminal 30 to acquire information about a menu specific to the relevant store from the Web server 40.

Subsequently, the wireless communication terminal 30 transmits the store information acquired in step S802 to the Web server 40 (S803). The wireless communication terminal 30 can transmit the store information through a general-purpose browser application or a dedicated application.

Then, the Web server 40 transmits store-specific menu information to the wireless communication terminal 30 on the basis of the received store information (S804).

Then, the wireless communication terminal 30 displays the store-specific menu on the input/output unit 330 on the basis of the received menu information (S805).

Further, the wireless communication terminal 30 determines the menu selection and order on the basis of the customer's operation and holds the determined order information (S806). Moreover, the processing in steps S805 and S806 can be implemented by the user interface as illustrated in FIGS. 4 and 5.

Further, the reader 10a according to the present embodiment can continuously transmit the advertisement during execution of the processing in steps S802 to S806 (S807).

The wireless communication terminal 30, when determining the order information in step S806, acquires the identification information from the advertisement transmitted in step S807 (S808).

Subsequently, the wireless communication terminal 30 issues a connection request to the reader 10a on the basis of the identification information acquired in step S808 (S809).

Then, the reader 10a executes a connection response to the connection request issued in step S809 (S810). The connection request in step S809 and the connection response in step S810 allow the wireless communication between the reader 10a and the wireless communication terminal 30 to be established.

In a case where the wireless communication between the reader 10a and the wireless communication terminal 30 is established, the wireless communication terminal 30 transmits the order information determined in step S806 to the reader 10a (S811).

Then, the reader 10a, when receiving the order information, transmits an acknowledgement to the order to the wireless communication terminal 30 (S812).

Then, the wireless communication terminal 30, when receiving the acknowledgement, displays a confirmation screen relating to payment on the input/output unit 330 (S813).

Here, in a case where the confirmation operation by the consumer is performed, the wireless communication terminal 30 subsequently transmits a payment request to the Web server 40 (S814).

Then, the Web server 40, when receiving the payment request, transmits a payment approval to the wireless communication terminal 30 and executes the payment processing relating to service (S815). In this event, the Web server 40 can perform the balance check processing as described in the first embodiment.

Then, the wireless communication terminal 30, when receiving the payment approval, transmits order determination information to the reader 10a (S816).

Then, the reader 10a, when receiving the order determination information, transmits order acceptance information to the wireless communication terminal 30 (S817).

Further, the reader 10a executes order processing on the basis of the order determination information received in step S816 (S818).

On the other hand, the wireless communication terminal 30, when receiving the order acceptance information, displays the received order acceptance information on the input/output unit 330 (S819). Moreover, the display of the order acceptance information can be implemented by the user interface as illustrated in FIG. 6.

The operation of the wireless communication system 1000 and the wireless communication terminal 30 in the order stage of the present embodiment is described above. Moreover, the preparation completion stage and the provision completion stage following the order stage described with reference to FIG. 15 can be substantially the same as the processing in the first embodiment, so the description thereof is omitted.

As described above, the wireless communication system 1000 according to the present embodiment makes it possible to implement the provision of menu information and the payment processing in on-line state, thereby reducing significantly the processing load of the reader 10.

Further, the Web server 40 and the reader 10 according to the present embodiment are not necessarily connected in real time to each other in on-line state, so it is possible to centralize the payment processing of a plurality of stores, thereby significantly reducing the construction cost for each store.

3. HARDWARE CONFIGURATION EXAMPLE

Figure 16:
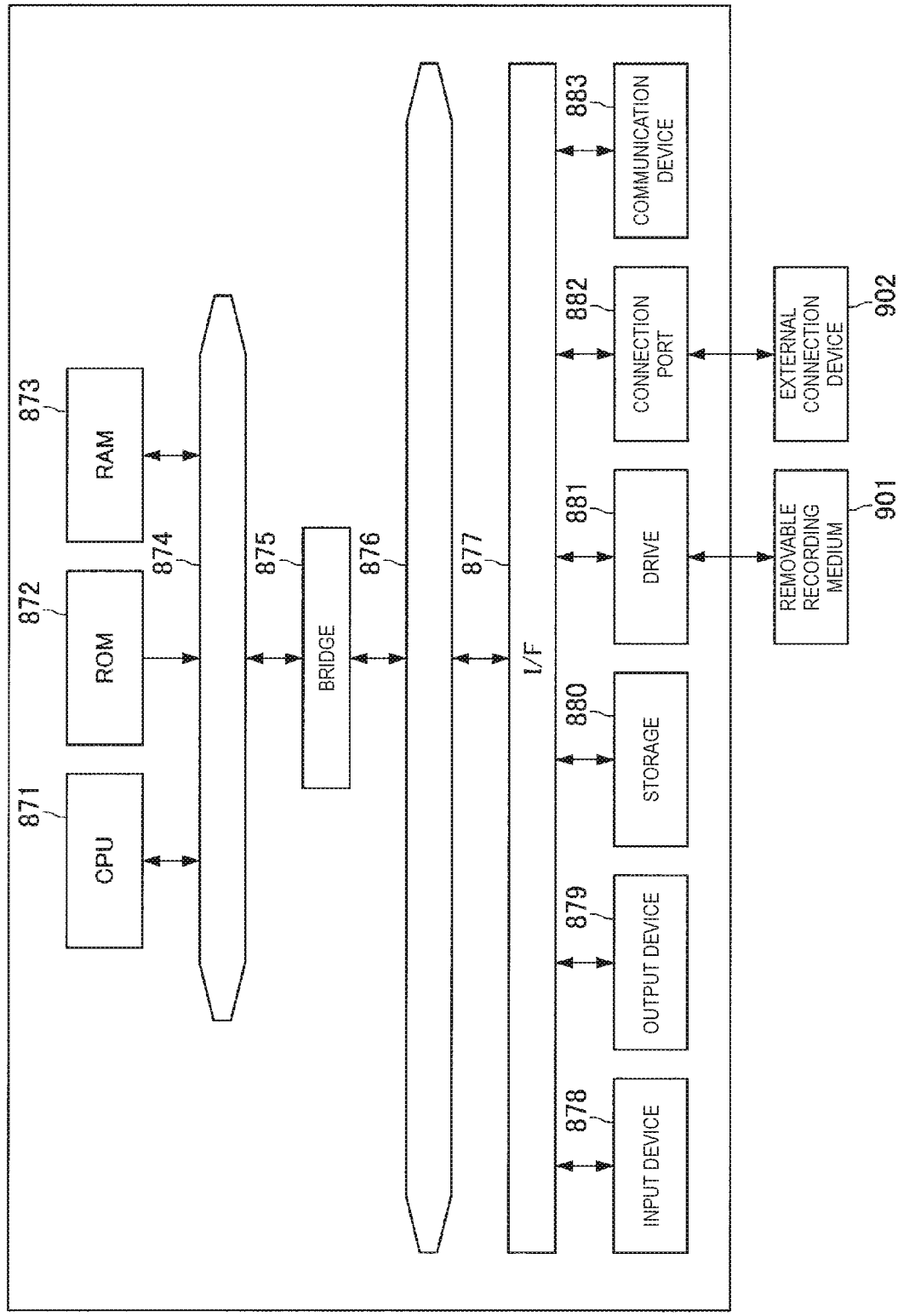
FIG. 16 is a diagram illustrating a hardware configuration example according to the present disclosure.

An example of the hardware configuration common to the reader 10 and the wireless communication terminal 30 according to the present disclosure is now described. FIG. 16 is a block diagram illustrating an example of the hardware configuration of the reader 10 and the wireless communication terminal 30 according to the present disclosure. Referring to FIG. 16, the reader 10 and the wireless communication terminal 30 each includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.

(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves. In addition, the input device 878 includes a speech input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure can include various devices that provide a tactile sensation to a user, such as a motor that generates vibration.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901, such as magnetic disks, optical disks, magneto-optical disks, and semiconductor memory, or writes information to the removable recording medium 901.

(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 can be, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), BLE, NFC, or wireless USB (WUSB), a router for optical communication, a router for asymmetric digital subscriber line (ADSL), or a modem for various communications.

4. CONCLUDING REMARKS

As described above, the wireless communication system 1000 according to the present disclosure has a function of transmitting a signal corresponding to the stage of service with the radio field intensity corresponding to the relevant stage, that is, the communication range. In addition, the wireless communication system 1000 according to the present disclosure is capable of transmitting and receiving various pieces of information corresponding to the service stage to and from the wireless communication device connected thereto and executing the payment processing relating to service. In addition, the wireless communication system 1000 according to the present disclosure is capable of releasing the locked state of the provision device 20 on the basis of the payment log relating to the payment processing and providing the consumer with an article relating to service. Such a configuration makes it possible to implement more efficient and convenient processing depending on the stage of service.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the above embodiments describe the case where the wireless communication system 1000 according to the present disclosure is applied to the provision of service in a coffee shop or a food court is described as an example, but the present technology is not limited to this example.

In one example, the wireless communication system 1000 according to the present disclosure can be applied to the provision of service in a large supermarket or the like. In many large supermarkets, a consumer moves goods from the shelf to the cart and makes payment by aligning them with the cart in the payment window. However, searching for a commodity shelf displaying desired goods or carrying heavy goods by a customer himself can be a heavy burden to the consumer.

Thus, application of the wireless communication system 1000 according to the present disclosure to the large supermarket mentioned above makes it possible to distinguish between an area for ordering goods, an area for payment, and an area for delivering goods using two axes of time and place, thereby providing a high value added service.

Further, the wireless communication system 1000 according to the present disclosure is similarly applicable to a showroom-type furniture store. In this event, registration of the parking lot area used by the consumer at the time of payment makes it possible for goods to be delivered near the customer's vehicle.

Further, although the above embodiments describe the case where the wireless communication terminal 30 includes the SE as an example, the payment processing according to the present disclosure can be implemented by a technique using host card emulation (HCE) or the like in addition to the technique using the SE.

Further, although the above embodiments describe the case where the wireless communication terminal 30 is a mobile terminal such as a smartphone as an example, the wireless communication terminal 30 according to the present disclosure can be a simple output device equipped with a wireless communication function, the SE, or the like.

Further, the respective steps in the processing of the wireless communication system 1000 and the wireless communication terminal 30 of the present disclosure are not necessarily processed in chronological order in accordance with the sequences listed in the sequence diagrams. In one example, the respective steps in the processing of the wireless communication system 1000 and the wireless communication terminal 30 can be processed in an order different from the sequences listed in the sequence diagrams or can be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A wireless communication system including:

a plurality of wireless communication devices configured to transmit a signal relating to provision of service, in which the service includes a plurality of stages relating to provision, and a plurality of the wireless communication devices correspond to a plurality of the respective stages and transmit the signal corresponding to the stage with radio field intensity corresponding to the stage.

(2)

The wireless communication system according to (1), in which the signal includes an advertisement, and a plurality of the wireless communication devices transmit the advertisement corresponding to the stage.

(3)

The wireless communication system according to (1) or (2), in which a plurality of the stages include a provision completion stage of service, and a first wireless communication device corresponding to the provision completion stage transmits the signal with lower radio field intensity as compared to a wireless communication device corresponding to another stage.

(4)

The wireless communication system according to (3), further including:

a provision device configured to provide an article, in which the first wireless communication device releases a locked state of the provision device on the basis of service history information received from a connection device connected on the basis of the signal.

(5)

The wireless communication system according to (4), in which the provision completion stage is an article delivery stage, and the provision device includes a container configured to store the article.

(6)

The wireless communication system according to (4) or (5), in which the service history information includes a payment log relating to the service, and the first wireless communication device releases the locked state of the provision device on the basis of the payment log.

(7)

The wireless communication system according to any of (3) to (6), in which a plurality of the stages include a preparation completion stage relating to provision of service, and a second wireless communication device corresponding to the preparation completion stage transmits the signal with lower radio field intensity as compared to the first wireless communication device.

(8)

The wireless communication system according to (7), in which the second wireless communication device transmits a preparation completion notification relating to provision of the service to a connection device connected on the basis of the signal.

(9)

The wireless communication system according to any of (3) to (8), in which a plurality of the stages include an order stage of service, and a third wireless communication device corresponding to the order stage transmits the signal with higher radio field intensity as compared to the first wireless communication device.

(10)

The wireless communication system according to (9), in which the third wireless communication device receives order information relating to the service from a connection device connected on the basis of the signal.

(11)

The wireless communication system according to (9) or (10), in which the third wireless communication device transmits menu information relating to the service to a connection device connected on the basis of the signal.

(12)

The wireless communication system according to any of (9) to (11), in which the third wireless communication device performs payment processing relating to the service with a connection device connected on the basis of the signal.

(13)

The wireless communication system according to (9) or (10), in which the third wireless communication device transmits store information used to specify a store that provides the service.

(14)

The wireless communication system according to (13), further including:

a Web server configured to provide information relating to the service, in which the Web server performs payment processing relating to the service with a connection device on the basis of the store information transmitted from the connection device connected on the basis of the signal.

(15)

The wireless communication system according to (13) or (14), in which the Web server transmits menu information relating to the service to a connection device on the basis of the store information transmitted from the connection device connected on the basis of the signal.

(16)

The wireless communication system according to any of (3) to (15), in which the first wireless communication device transmits additional information relating to provision of the service to a connection device connected on the basis of the signal.

(17)

A wireless communication device including:

a transmitter configured to transmit a signal relating to a request of service; and a receiver configured to receive a signal relating to provision of the service from a connection device connected on the basis of a signal relating to the request, in which the service includes a plurality of stages relating to provision, and the transmitter transmits the signal relating to the request corresponding to the stage with radio field intensity corresponding to the stage.

REFERENCE SIGNS LIST

10 reader
110 communication unit
120 control unit
130 input/output unit
20 provision device
30 wireless communication terminal
310 communication unit
320 control unit
330 input/output unit
40 Web server
50 network

The invention claimed is:

1. A wireless communication system, comprising:
   a plurality of wireless communication devices configured to transmit a plurality of signals, wherein
      the plurality of signals is associated with a service to be provisioned,
      the service to be provisioned includes a plurality of stages associated with the service to be provisioned,
      the plurality of stages corresponds to a sequence of actions associated with the service to be provisioned,
      each wireless communication device of the plurality of wireless communication devices is associated with at least one stage of the plurality of stages,
      a first signal of the plurality of signals is associated with a first stage of the plurality of stages, and
      a first radio field intensity of the first signal corresponds to the first stage.

2. The wireless communication system according to claim 1, wherein
   the first signal comprises an advertisement, and
   a first wireless communication device of the plurality of wireless communication devices is configured to transmit the advertisement associated with the first stage.

3. The wireless communication system according to claim 1, wherein
   the plurality of stages comprises a provision completion stage of the service to be provisioned,
   the provision completion stage is a stage of delivery of an article,
   a first wireless communication device of the plurality of wireless communication devices is configured to transmit a second signal,
   the second signal has a second radio field intensity lower than the first radio field intensity, and
   the first wireless communication device is associated with the provision completion stage.

4. The wireless communication system according to claim 3, further comprising:
   a provision device configured to provide the article, wherein
      the first wireless communication device is further configured to:
         establish a connection with a connection device based on the second signal;
         receive service history information from the connection device; and
         release a locked state of the provision device based on the service history information.

5. The wireless communication system according to claim 4, wherein
   the provision device comprises a container configured to store the article.

6. The wireless communication system according to claim 4, wherein
the service history information includes a payment log associated with the service to be provisioned, and
the first wireless communication device is further configured to release the locked state of the provision device based on the payment log.

7. The wireless communication system according to claim 3, wherein
the plurality of stages comprises a preparation completion stage associated with the service to be provisioned,
a second wireless communication device of the plurality of wireless communication devices is configured to transmit a third signal,
the third signal has a third radio field intensity lower than the second radio field intensity, and
the second wireless communication device is associated with the preparation completion stage.

8. The wireless communication system according to claim 7, wherein
the second wireless communication device is further configured to:
establish a connection with a connection device based on the third signal; and
transmit a preparation completion notification to the connection device, and
the preparation completion notification is associated with the service to be provisioned.

9. The wireless communication system according to claim 3, wherein
the plurality of the stages comprises an order stage of service to be provisioned,
a third wireless communication device of the plurality of wireless communication devices is configured to transmit a fourth signal,
the fourth signal has a fourth radio field intensity higher than the second radio field intensity, and
the third wireless communication device is associated with the order stage.

10. The wireless communication system according to claim 9, wherein
the third wireless communication device is further configured to:
establish a connection with a connection device based on the fourth signal; and
receive order information from the connection device, and
the order information is associated with the service to be provisioned.

11. The wireless communication system according to claim 9, wherein
the third wireless communication device is further configured to:
establish a connection with a connection device based on the fourth signal; and
transmit menu information to the connection device, and
the menu information is associated with the service to be provisioned.

12. The wireless communication system according to claim 9, wherein
the third wireless communication device is further configured to:
establish a connection with a connection device based on the fourth signal; and
execute a payment process with the connection device, and
the payment process is associated with the service to be provisioned.

13. The wireless communication system according to claim 9, wherein
the third wireless communication device is further configured to transmit store information,
the store information specifies a store, and
the store is associated with the service to be provisioned.

14. The wireless communication system according to claim 13, further comprising:
a Web server configured to:
receive the store information from a connection device based on the fourth signal;
transmit information associated with the service to be provisioned; and
execute a payment process with the connection device based on the received store information, wherein the payment process is associated with the service to be provisioned.

15. The wireless communication system according to claim 13, further comprising:
a Web server configured to:
receive the store information from a connection device based on the fourth signal; and
transmit menu information to the connection device based on the received store information.

16. The wireless communication system according to claim 3, wherein
the first wireless communication device is further configured to:
establish a connection with a connection device based on the second signal; and
transmit additional information to the connection device, and
the additional information is associated with the service to be provisioned.

17. A wireless communication device, comprising:
a transmitter configured to transmit a first signal, wherein the first signal is associated with a request of a service to be provisioned; and
a receiver configured to:
establish a connection with a connection device based on the first signal; and
receive a second signal from the connection device, wherein
the second signal is associated with the service to be provisioned,
the service to be provisioned includes a plurality of stages associated with the service to be provisioned,
the plurality of stages corresponds to a sequence of actions associated with the service to be provisioned,
the first signal is associated with a first stage of the plurality of stages, and
a radio field intensity of the first signal corresponds to the first stage.

18. A wireless communication system, comprising:
a plurality of wireless communication devices configured to transmit a plurality of signals, wherein
the plurality of signals is associated with a service to be provisioned,
the service to be provisioned includes a plurality of stages associated with the service to be to be provisioned,
the plurality of stages corresponds to a sequence of actions associated with the service to be provisioned, each wireless communication device of the plurality of wireless communication devices is associated with at least one stage of the plurality of stages,
a first signal of the plurality of signals is associated with a first stage of the plurality of stages, and
a first radio field intensity of the first signal corresponds to the first stage; and
a provision device configured to provide an article, wherein
a first wireless communication device of the plurality of wireless communication devices is configured to:
establish a connection with a connection device based on a second signal;
receive service history information from the connection device; and
release a locked state of the provision device based on the service history information.

* * * * *